(12) United States Patent
Widmark et al.

(10) Patent No.: US 10,322,778 B2
(45) Date of Patent: Jun. 18, 2019

(54) ADJUSTABLE DEVICE AND A BOAT PROVIDED WITH A STABILIZING DEVICE

(71) Applicant: HUMPHREE AB, Gothenburg (SE)

(72) Inventors: Christer Widmark, Partille (SE); Björn Holmene, Sävedalen (SE); Gunnar Hallnéus, Mölndal (SE)

(73) Assignee: HUMPHREE AB, Gothenburg (SE)

( * ) Notice: Subject to any disclaimer, the term of this patent is extended or adjusted under 35 U.S.C. 154(b) by 72 days.

(21) Appl. No.: 15/576,167

(22) PCT Filed: May 23, 2016

(86) PCT No.: PCT/EP2016/061600
§ 371 (c)(1),
(2) Date: Nov. 21, 2017

(87) PCT Pub. No.: WO2016/188963
PCT Pub. Date: Dec. 1, 2016

(65) Prior Publication Data
US 2018/0154989 A1   Jun. 7, 2018

(30) Foreign Application Priority Data

May 22, 2015 (SE) ...................... 1550659

(51) Int. Cl.
*B63B 39/06* (2006.01)
*B63B 43/04* (2006.01)
*H02K 7/116* (2006.01)

(52) U.S. Cl.
CPC ............ *B63B 39/061* (2013.01); *B63B 39/06* (2013.01); *B63B 43/04* (2013.01); *H02K 7/116* (2013.01); *B63B 2039/065* (2013.01)

(58) Field of Classification Search
CPC . B63B 2001/325; B63B 39/06; B63B 39/061; B63B 39/062; B63B 2039/063;
(Continued)

(56) References Cited

U.S. PATENT DOCUMENTS

| 2,942,570 A * | 6/1960 | Kollenberger .......... B63B 39/06 114/126 |
| 3,200,782 A | 8/1965 | Thomas et al. |

(Continued)

FOREIGN PATENT DOCUMENTS

| CN | 103803032 A | 5/2014 |
| DE | 19802354 A1 | 8/1999 |

(Continued)

OTHER PUBLICATIONS

International Search Report and Written Opinion for PCT International Application No. PCT/EP2016/061600, dated Jul. 29, 2016, 10.

*Primary Examiner* — Ajay Vasudeva
(74) *Attorney, Agent, or Firm* — Johnson, Marcou & Isaacs, LLC; John M. Harrington, Esq.

(57) ABSTRACT

The invention relates to an adjustable device, pivotally arranged about a pivot axis by means of a rotating electric motor having a rotor and a stator via a reduction gearing for reducing the rotation of the motor to an adjustment movement of the adjustable device, wherein the reduction gearing is a planetary gearing, the axis of the electric motor is coaxial with the axis of the reduction gearing and with the pivot axis of the adjustable device and the reduction gearing and the electric motor to form a compact construction.

15 Claims, 4 Drawing Sheets

(58) Field of Classification Search
CPC ..... B63B 2039/065; B63B 43/04; F16H 1/28; F16H 2001/2872; F16H 2001/2881; F16H 2001/289; F16H 1/30; F16H 1/32; H02K 7/116
USPC .................................. 114/140–143, 280–286
See application file for complete search history.

(56) References Cited

U.S. PATENT DOCUMENTS

| | | | | |
|---|---|---|---|---|
| 3,618,553 | A | * | 11/1971 | Ehluss ............... B63B 39/06 114/126 |
| 3,757,723 | A | * | 9/1973 | Pangalila ............ B63B 39/06 114/126 |
| 3,842,777 | A | * | 10/1974 | Larsh ............... B63B 39/06 114/126 |
| 4,967,682 | A | | 11/1990 | O'Donnell et al. |
| 5,152,238 | A | * | 10/1992 | Page ................... B63B 41/00 114/143 |
| 6,453,836 | B1 | | 9/2002 | Ditmore et al. |
| 6,893,371 | B2 | | 5/2005 | Mills et al. |
| 2004/0011269 | A1 | | 1/2004 | Gordillo |
| 2011/0245006 | A1 | | 10/2011 | Negishi et al. |
| 2015/0050849 | A1 | | 2/2015 | Nutt |

FOREIGN PATENT DOCUMENTS

| | | |
|---|---|---|
| EP | 1371547 A1 | 12/2003 |
| EP | 1498348 A1 | 1/2005 |
| EP | 1719656 A1 | 11/2006 |
| EP | 2172394 A1 | 4/2010 |
| EP | 2452870 A1 | 5/2012 |
| EP | 2703279 A1 | 3/2014 |
| EP | 2910463 A1 | 8/2015 |
| GB | 833343 A | 4/1960 |
| NL | 1027525 C1 | 5/2006 |

* cited by examiner

ADJUSTABLE DEVICE AND A BOAT PROVIDED WITH A STABILIZING DEVICE

CROSS REFERENCE TO RELATED APPLICATIONS

This application is a 35 U.S.C. § 371 national stage of International Application No. PCT/EP2016/061600 filed on May 23, 2016, published in English under PCT Article 21(2), which claims the benefit of priority to Swedish Patent Application No. 1550659-5 filed on May 22, 2015, the disclosures of which are hereby incorporated by reference.

FIELD OF INVENTION

The present invention relates to an adjustable device, pivotally arranged about a pivot axis by means of a rotating electric motor having a rotor and a stator via a reduction gearing for reducing the rotation of the motor to the adjustment movement of the adjustable device, especially suited for use on a boat.

BACKGROUND OF INVENTION

For passengers on a boat it is of interest to avoid discomfort due to influence from wind and waves causing the boat to roll i.e. around the longitudinal axis of the boat. When the boat is at normal travelling speeds such as above 5 knots (2.6 m/s), this rolling is normally easy to counteract. However, at lower speeds the passengers and crew may experience discomfort from the rolling.

It is therefore a need to provide boats and vessels with devices that counteract rolling at low speeds, Various devices for stabilizing a boat are disclosed in WO 2008095323, FR 2115569, FR 2807006, DE 102004038941, DE 349779, U.S. Pat. No. 7,555,992, US 2014261134, US 2005000401 and U.S. Pat. No. 4,967,682.

Furthermore, the mechanisms and/or adjustable device that is required to pivot the fins between the two modes will be relatively complicated, as for instance disclosed in EP2172394.

SUMMARY OF INVENTION

The object of the present invention is to overcome some problems related to prior art.

This object is achieved in that there is provided an adjustable device in accordance with the specific features specified in claim 1.

Arranging the motor coaxial with the pivot axis allows an extra compact construction, which is a major advantage in connection with boats where space often is limited, i.e. the design may fulfil needs in many different applications of arrangements on a boat using a motor with transmission/gearing.

According to a further preferred embodiment, the reduction gearing and the electric motor are integrated into one single unit, which further contributes to achieve a compact construction.

According to a further preferred embodiment, the reduction gearing is a planetary gearing.

Using a planetary gearing simplifies to achieve the compact construction.

A further object of the present invention is to also provide a solution to overcome the problems related to stabilizing of a boat at low speeds without considerably affecting the performance negatively at higher speeds.

This object may be achieved in that specific features specified in dependent claims are used. The boat may thus then be such that each paddle is mounted on a transom of the hull, in operation mode reaches laterally and/or vertically outside the transom, and in resting position is shielded by the transom, and each paddle is arranged to change between operation mode and resting position by rotation around its rotational axis.

When the paddles are in the operation mode, the rotation of these will create reaction forces and torque that effectively can be used to counteract the rolling at low speeds. Since the paddles in operation mode are located outside the area covered by the transom, the lever arms for counteracting the rolling will be long, in particular when the paddles are located laterally outside the transom. Since the paddles in the resting position, i.e. during transit speed, are located shielded by the transom they are not facing the streaming water and thereby do not create any resistance that would reduce the speed.

By arranging the paddles such that the counteracting rotational movements as well as the rotational movement between resting position and operation mode are performed around one and the same axis, the device will be mechanically simple, since one and the same drive means can perform both operations. Thereby the device will be reliable and robust such that the need for repair and maintenance will be small. The simple construction also makes the device cost effective, which is particularly important for small boats and vessels between for which the device primarily is intended.

The expression "shielded by the transom" is to be understood as that the paddles are shielded from the on-flowing water when the boat travels at speeds that make the transom more or less free from backflow. Usually a speed between 10 to 15 knots for boats between 8 to 50 meter. The paddles are thus in this position located behind and within the projection of the profile of the transom on a vertical plane perpendicular to the longitudinal axis of the boat.

It is also to be understood that the rotation is not restricted regarding the direction of rotation. The paddles thus can make an oscillating rotation.

The transom may be the actual transom stern at the very aft end of the boat or an intermediate transom located somewhere along the longitudinal extension of the boat and having a rearward facing free surface. When an intermediate transom is present, the stabilizing device may include paddles mounted at both the transoms.

According to a further embodiment, each rotational axis may form an angle of less than 30° with a line parallel to the longitudinal axis of the boat.

Preferably the angle is in the range of 0 to 10°. The counteracting torque from the oscillating paddles is more effective the more the rotational axis is in parallel to the longitudinal axis. In this respect it is therefore desirable to have this angle close to zero. Other considerations may, however, give reason to have the rotational axes somewhat inclined.

According to a further embodiment, two paddles may be symmetrically arranged with respect to a vertical central plane through the longitudinal axis of the boat, and the two paddles have the same size and shape.

By this symmetrical arrangement, the control of the counteracting rotational movements of the paddles is easier to attain than otherwise. Through this arrangement the movement impacted on one paddle normally will equal the moving pattern of the other one.

According to a further embodiment, each paddle may its axis of rotation close to a lateral side of the transom.

In case the rotational axis is not in parallel to the longitudinal axis of the boat, it is to be understood that "close to the lateral side of the transom" refers to the point where the rotational axis intersects the transom. This embodiment facilitates to locate the paddle laterally of the transom without long connecting rods between the rotational axis and the paddle blade. The counteracting force and torque will be larger and the construction robust.

According to a further preferred embodiment, each paddle is provided with shaft means for rotating the paddle, which shaft means is aligned with the respective rotational axis and is drivingly connected to drive means.

Using a shaft aligned with the rotational axis for rotating the paddle is a very simple solution in comparison to other alternatives such as using linear cylinders acting on the paddles for pivoting these ore employing a transmission. Rotating the paddles by means of shafts also simplifies to obtain an adequate and accurate actuation. The shaft means may be two separate coaxial shafts, one for the counteracting movements and the other one for moving the paddle between resting position and operation mode. Alternatively one and the same shaft may be employed for both kind of movements.

According to a further embodiment, the boat may further include sensing means sensing at least one parameter indicative of the tendency of the boat to rotate around the longitudinal axis of the boat.

By the sensing means it will be possible to obtain information that is useful for the operation of the paddles in order to optimize their counteracting efficiency.

According to a further embodiment, the parameter may be the angular position of the boat around the longitudinal axis, the first time derivate of the angular position or the second time derivate of the angular position, or the parameter is obtained from processed data from a plurality of these sensed parameters.

These parameters are particularly important for determining the optimal movement pattern of the paddles. In many cases two or all of these parameters are needed to get the best information about how to perform the counteracting rotation. The obtained values of the sensed parameters are in such case used as input information to be processed according to an appropriate algorithm giving balanced weight to each of the sensed parameters and their interaction in order to provide an output being the determining parameter for controlling the rotation of the paddles.

According to a further embodiment, the parameter may govern the rotation of each paddle.

This provides an automatic operation of the paddles in response to the parameter, which assures that the operation will be as precise as possible without any distortion from manual interference. To govern the rotation of a paddle may include the angular extension of the rotation, the rotational speed and acceleration and the applied driving torque.

According to a further embodiment, the boat may include a speed measuring device measuring the speed of the boat, and a control device arranged to position each paddle in the resting position when the boat speed is above a certain threshold and to set the paddle in operation mode when the boat speed is at or below the threshold.

As mentioned the purpose of the stabilizing device may be to provide the counteracting rotation only at low speeds, whereas at higher speeds the paddles are to be resting and possibly not affect the boat speed negatively. By this embodiment it is automatically attained that the paddles are in operation mode when required but otherwise not. Therefor the advantages of the invention are gained from to a larger extent than if the change had to be made manually or semi-manually.

It may be preferred that the threshold is in the range of 10 to 15 knots (5.1-7.6 m/s). In most cases it is optimal to have the threshold at this level. In most applications the aim is to keep the stabilizing devices, paddles active up to speed where the transom start to be free from the backflow of water.

The threshold may be adjustable. Thereby it will be possible to adapt the device to various external conditions that might have influence on the optimal level of the threshold or to take into account subjective criteria such as the need for comfort vs the need of economical driving of the boat.

According to a further embodiment, the stabilizing device of the boat may further include at least one stabilizing fin, which fin is angularly adjustable around a pivot axis, and further includes a rotating electric motor for performing adjustment movements and a reduction gearing reducing the rotation of the motor to the adjusting movement of the fin, whereby the axis of the electric motor is coaxial with the pivot axis. Preferably there are at least two fins present, one adjacent each side of the boat. The fins may contribute to further stabilize the boat against rolling.

Arranging the motor coaxial with the pivot axis allows an extra compact construction, which is a major advantage in connection with boats where space often is limited, i.e. the design may fulfil needs in many different applications of arrangements on a boat using a motor with transmission/gearing.

According to a further preferred embodiment, the reduction gearing and the electric motor are integrated into one single unit, which further contributes to achieve a compact construction.

According to a further embodiment, the stabilizing device further may include at least one interceptor mounted at the bottom edge of the aft transom stern. Preferably there are at least two interceptors.

It is to be understood that the stabilizing fin alternatively may be used for a boat having a stabilizing device without the paddles according to the present invention, and thus the boat in that case will be stabilized solely by the fin(s) or the combination of fin(s) and interceptor(s).

It is also to be understood that the combination of fin(s) and interceptor(s) for the stabilizing not necessarily requires that the arrangement of the motor and the reduction gearing is as specified in the embodiment described above.

According to the one of the aspect of the invention, the object is achieved by a stabilizing device arranged to be mounted on the hull of a boat such that it results in a boat according to the invention, in particular according to any of the preferred embodiments thereof.

Preferably the invented stabilizing device includes at least two paddles arranged to be mounted on the hull of a boat, each paddle being rotatable around a respective rotational axis, which stabilizing device is arranged to be set in an operation mode at which each paddle is arranged to be rotatable around its rotational axis or in a resting position, at which each paddle is arranged to be kept stationary, whereby each paddle is arranged to be mounted on a transom of the hull, in operation mode reaches laterally and/or vertically outside the transom, and in resting position is shielded by the transom, and whereby each paddle is arranged to change between the operation mode and the resting position by rotation around its rotational axis.

According to further preferred embodiments of the invented stabilizing device, it includes the features that inherently can be derived from any of the preferred embodiments of the invented boat.

Further preferred embodiments of the boat and the stabilizing device, respectively, may be formed by any possible combination of features in the preferred embodiments described above as well as any possible combination of these features and features described in the following description of examples of a boat and a stabilizing device according to the invention.

DESCRIPTION OF EXAMPLES

Figure 1:
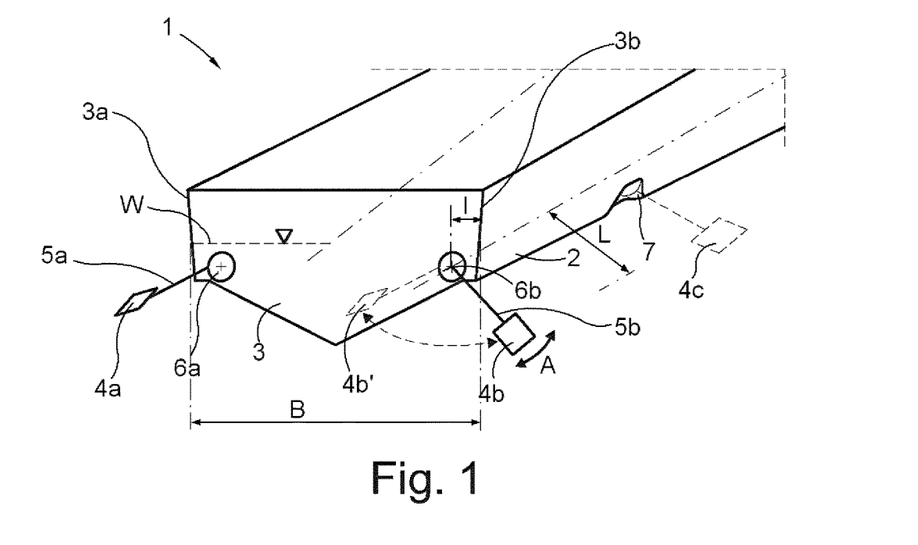
FIG. 1 is an elevation view of a boat according to a first example of the invention.

FIG. 1 in an elevation view illustrates a boat according to a first example of the invention. Only the hull 2 of the boat is shown, and the waterline is indicated by W. At the transom 3 at the aft of the hull 2 two paddles 4a, 4b are mounted for rotational movement around a respective rotational axis 6a, 6b. Each paddle 4a, 4b is by a level arm 5a, 5b connected to a respective shaft aligned with the corresponding rotational axis 6a, 6b, positioned a distance L relatively close to the side edges 3a, 3b of the transom. The arms 5a, 5b are of sufficient length L for the paddles 4a, 4b to be located laterally outside the transom 3, when these are in an operation mode as illustrated in the figure, wherein preferably L>B*0.2, more preferred L≥B*0.5. Where B is the beam of the transom of the vessel.

Each paddle 4a, 4b has a substantially planar shape, presenting a substantial area A, e.g. about B*0.02 to B*0.25, wherein B represents the beam of the vessel with the plane in parallel to the travelling direction of the boat, i.e. perpendicular to the rotational direction of the paddle. The paddles will normally be merely held in the operation mode when the boat travels at low speed. Thereby each paddle is driven to move angularly as indicated by the arrow A. The paddle movements are tuned such that rolling of the boat around its longitudinal axis is counteracted. This is due to the forces and torques acting on the boat, which are created when the paddles are moved in a counter acting manner.

When the boot exceeds a certain speed e.g. 10 knots (preferably within the range of 5-15 knots) the need for stabilizing by the paddles is less important. At these higher speeds the resistance created by the paddles against the on-flowing water is considerably increased. Therefore the paddles 4a, 4b may be rotated to a resting position behind the transom 3. In the figure it is indicated how the right paddle 4b is moved angularly along the arrow to the resting position 4b' indicated by broken lines. In that position the paddle is effectively shielded from the on-flowing water by the transom 3. Paddle 4a is deactivated in a corresponding way.

In this example the hull 2 has an intermediate transom 7 at a distance forward from the transom stern 3 at the aft. Also at the intermediate transom 7 two paddles may be mounted in a similar way as those described above. They thus can be positioned in a resting position behind the intermediate transom 7 where they are shielded. In the figure it is illustrated in broken lines how one paddle 4c of these is in the operation mode.

Figure 2:
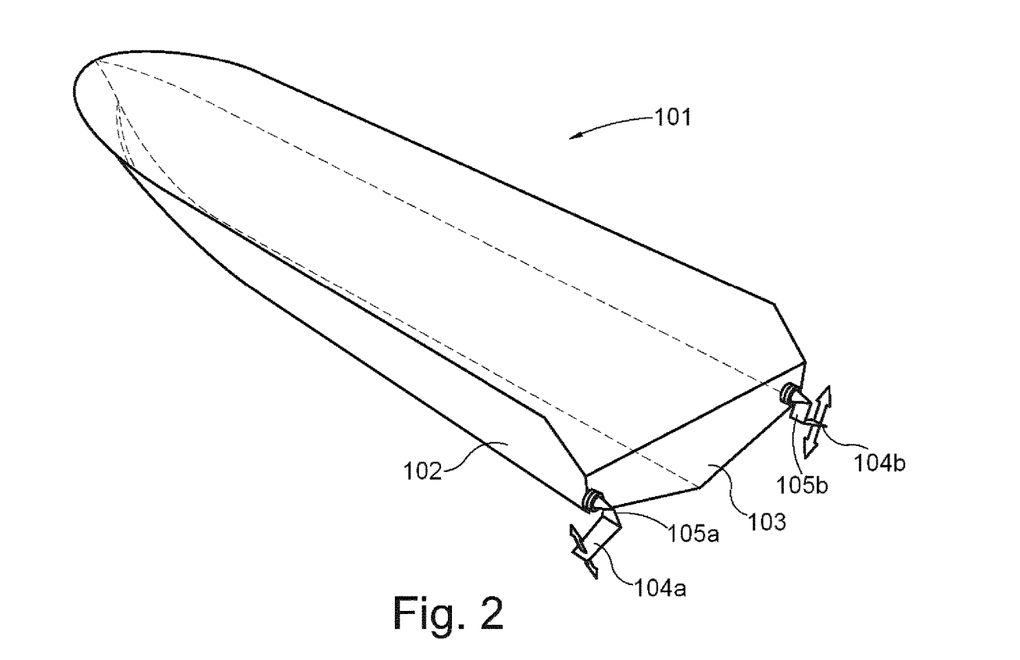
FIG. 2 is an elevation view of a boat according to a second example of the invention.

FIG. 2 illustrates a second example of a boat according to the invention. The hull 102 of the boat has no intermediate transom but only an aft transom stern 103 at which the two paddles 104a, 104b are mounted in a similar way as described with reference to FIG. 1. Each paddle 104a, 104b and its arm 105a, 105b is shaped as a rectangular plate angled about 90° forming a larger part being the paddle and a smaller part being the arm. In this figure the paddles 104a, 104b are in the operation mode. By making the paddles L-shaped the advantage is gained that the paddle parts 104a, 104b may be positioned at a lower level in their active mode, than the pivot points 6a, 6b. It is to be understood that also the arm parts 105a, 105b may assist in counter acting rolling, by also presenting surfaces that are arranged transversally in relation to the movement.

Figure 3:
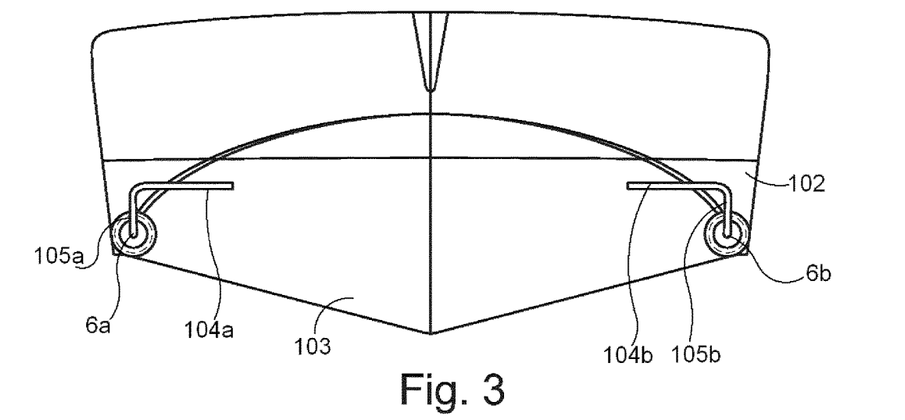
FIG. 3 is an end view towards the transom of the boat in FIG. 2, when the paddles are in the resting position.

FIG. 3 in an transom view from behind illustrates the boat when the paddles 104a, 104b are in the resting position shielded by the transom 103.

Figure 4:
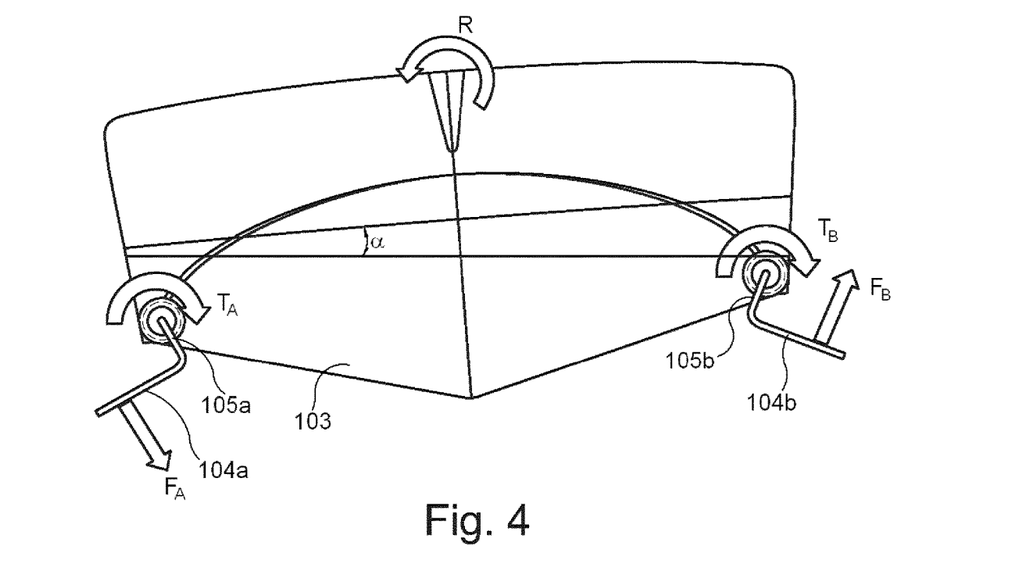
FIG. 4 is a view similar to that of FIG. 3, but is showing the paddles in the operation mode.

FIG. 4 in the same view as in FIG. 3 illustrates the boat when the stabilizing device is in the operation mode to counteract rolling. The figure illustrates the boat inclined an angle α relative to the horizontal and rotates counter-clockwise, as indicated by the arrow R, thereby increasing the inclination.

Each of the paddles 104a, 104b at this moment is driven to rotate counter clockwise. Thereby each paddle exerts a force $F_A$, $F_B$ respectively on the water creating a respective reaction force in the opposite direction which results in a reaction torque $T_A$, $T_B$ respectively. The reaction torques tend to rotate the boat in the clockwise direction, i.e. opposite to the direction of the rotation R, thus counteracting the latter, and vice-versa when the boat rolls clockwise.

Figure 7:
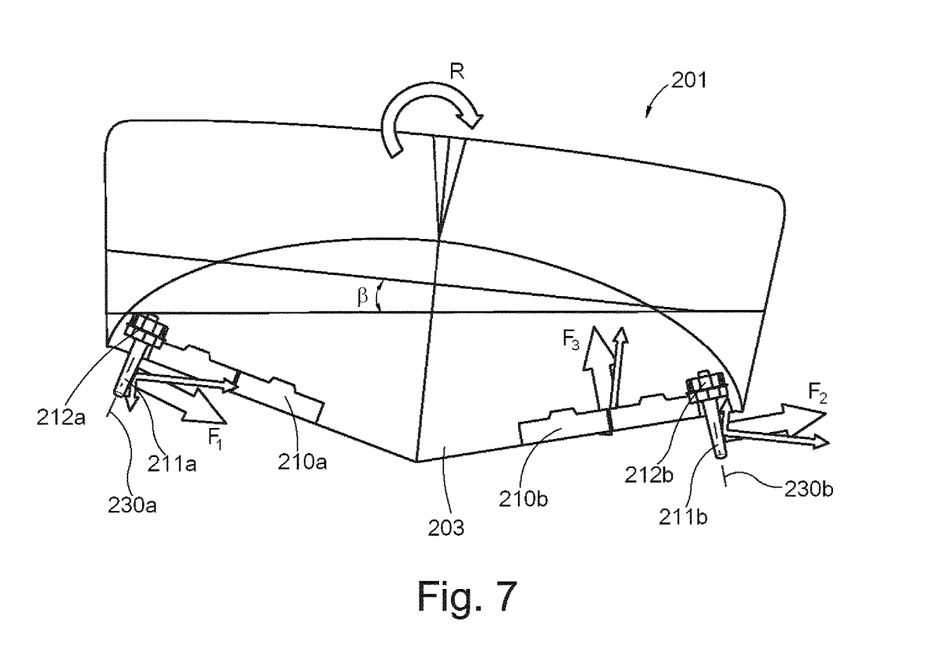

FIG. 7 illustrates a further example of a boat according to the invention, that may be continued with an arrangement as described above. The boat is shown from the rear end. The boat 201 is provided with a stabilizing system being a combination of interceptors 210a, 210b and stabilizing fins 211a, 211b. Each interceptor is mounted at a bottom edge of the aft transom stern 203. Each fin 211a, 211b is mounted on the bottom of a hull at a longitudinal location somewhere between the longitudinal middle of the boat and its aft. The units 212a, 212b, each containing an electric motor and a reduction gearing should in this view be inside the vessel between the middle of the boat length and the transom stern 203 but are for illustrative purpose drawn visible in the figure.

The boat is shown as inclined at an angle β relative to the horizontal and is rolling such that it has a clockwise rotational movement as indicated by the arrow R. The interceptor 210b creates a reaction force represented by the arrow $F_3$ which counteracts the rolling R.

Each stabilizing fin 211a, 211b has a hydrodynamic shape. By means of the respective motor unit 212a, 212b, the attack angle of the fins can be adjusted independently of each other. At low speeds each motor unit 212a, 212b, is actuating the respective fin 211a, 211b to make an oscillating rotational movement in response to requirements determined by the rolling of the boat. This waggling of the fins 211a, 211b affects the lifting forces of these. The figure illustrates the reaction forces $F_1$ and $F_2$ thereby created, which act in the counter-clockwise direction and thus counteracts the rolling R. This use of the stabilizing fins is earlier known per se.

However, the new combination of the stabilizing fins together with the interceptors result in an increased stabilizing effect. Thereby the fins can be made smaller than otherwise and thereby the resistance through the water will be lower. With this combination of fins and interceptors it is also attained that the fins may be located further to the rear end of the boat, which increases the travelling performance of the boat.

According to a preferred embodiment the fins 211a, 211b are arranged to be freely rotatable over +360°, i.e. there are no mechanical or electrical stops such that numerous revolutions in the same direction are possible. Thanks to this arrangement the fins 211a, 211b (independently) may be used to produce a paddling effect, e.g. to assist in maintaining a desired position when the boat is at anchor.

The invented combination of fins and interceptors may be used in a stabilizing device that also includes the paddles according to the present invention. Or it may be used without such paddles. Further the fins as such may be used also without paddles or interceptors.

Figure 5:
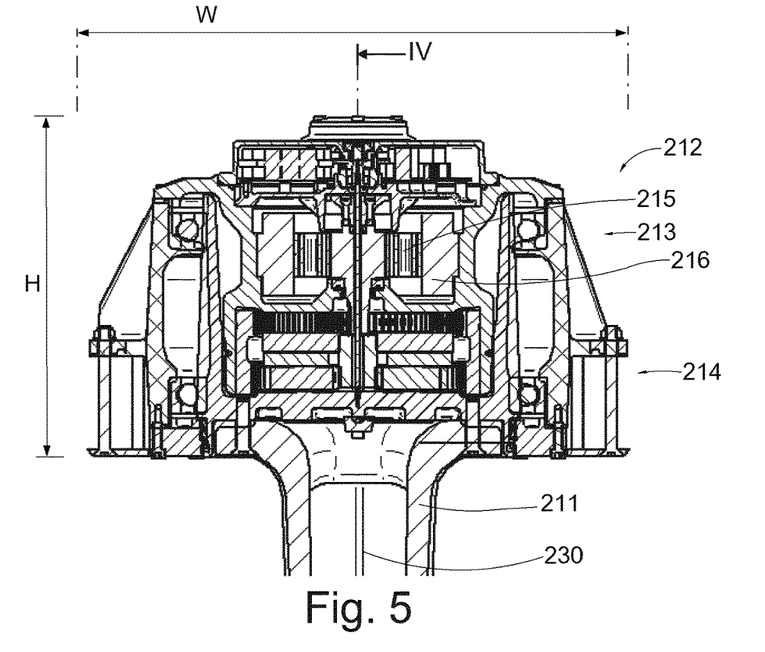
FIG. 5 is a section through a motor/gearing-unit according to a third example of the invention.

FIG. 5 illustrates in a section a motor unit 212 according to the present invention for actuation of a paddle 104a, 104b, a fin 211, or any other moveable device on a boat. The unit 212 has an electric motor 213 with a rotor 215 and a stator 216. It also has a reduction gearing 214 to reduce the motor rpm to what is adequate for the device movements around the pivot axis 230, e.g. a fin 211.

Figure 6:
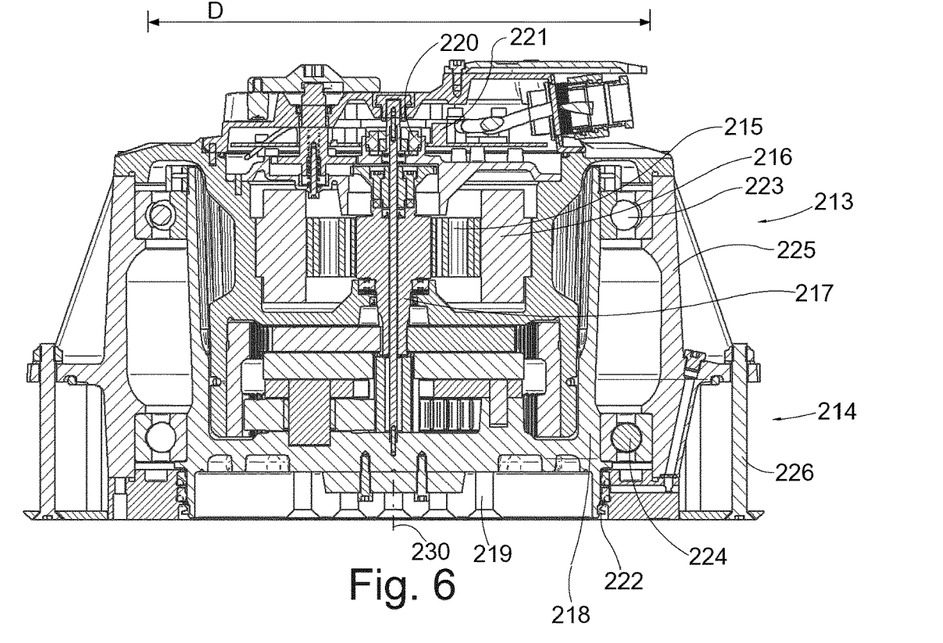
FIG. 6 is a section along line VI in FIG. 5 in an enlarged scale and, FIG. 7 is an end view towards the transom of the boat according to the third example of the invention.

As is shown better in detail in FIG. 6, the electric motor 213 and the reduction gearing 214 are integrated to form a single unit. The reduction gearing is of the planetary type. The rotor 215 of the motor has an extension 217 that directly constitutes the input of the planetary gearing, thereby eliminating a shaft between the rotor and the gearing. The hub 218 is the output of the planetary gearing, and the fin 211 (see FIG. 5) is attached to the hub 218 by bolts 219. The hub 218 is journalled in roller bearings 223, 224 in a casing 225 secured to the hull of the boat by sealing and supporting compound and bolts 226. The interior of the unit is sealed against the water by a sealing 222. By a decoder 220 and a process control block 221 sensor signals indicative of the pivoting are treated to govern the electric motor control for fin movements.

Thanks to the integration of the electric motor with the reduction gearing a less bulky construction is achieved with smaller dimensions and considerably lower weight. In a preferred embodiment the height H it is about the same as the width W, or even smaller than the width W. Since the fin 211 is attached direct to the hub there is no shaft that has to be journalled. The journaling thus is accomplished by the hub bearings 223, 224, which surrounds the gearing. Due to the large diameter D (e.g. 0.5 W≤D≤0.95 W) of the bearings it is possible to fit the electric motor and gearing in between the cylindrical space defined by the bearings. From the large diameter there is also a benefit to be able to use a simpler journaling arrangement, such that ball bearings may be employed.

The integrated electric motor and reduction gearing may advantageously be used also for adjusting fins on a boat where the fins are the sole stabilizing means.

It is evident that the scope of the claims are not limited by the described embodiments above. For instance, it is evident that many different devices may be connected to a motor and gearing as described above, i.e. many other devices that need to be moveable on a boat or any other space limited vessel/device where compactness is of great importance. Accordingly it is foreseen that protection may be applied for on its own regarding the motor and gearing arrangement, i.e. without any specified relationship to vessel or device. Moreover, it is also foreseen that the combination of the fin and interceptor arrangement may also be subject for its own protection, e.g. by means of one or more divisional/s.

The invention claimed is:

1. Adjustable boat stabilizing device, pivotally arranged about a pivot axis (230, 230a, 230b) by means of a rotating electric motor (213) having a rotor (215) and a stator (216) via a reduction gearing (214) for reducing the rotation of the motor to an adjustment movement of the adjustable device (4a, 4b, 104a, 104b), wherein the reduction gearing (214) is a planetary gearing, the axis of the electric motor (213) is coaxial with the axis of said reduction gearing (214) and with the pivot axis (230,230a, 230b) of said adjustable device (4a, 4b, 104a, 104b) and the reduction gearing (214) and the electric motor (213, 213a, 213b) to form a compact construction, and wherein a hub (218) is the output of the planetary gearing (214) and the electric motor (213, 213a, 213b) and the reduction gearing (214) are fitted in a cylindrical space defined by two bearings (223, 224) for pivotal movement of the hub (218), which bearings (223, 224) are fixed in a casing (225) arranged to be secured to a hull (2) of the boat, and wherein said adjustable device is at least one of a fin and a paddle.

2. The adjustable device according to claim 1, wherein the rotor (215) of the motor has an extension (217) that directly constitutes an input of the planetary gearing (214).

3. The adjustable device according to claim 1, wherein the hub (218) is the output of the planetary gearing (214) and the adjustable device (211) is directly attached to the hub (218).

4. The adjustable device according to claim 3, wherein a single unit is arranged with a casing (225) supporting at least one bearing (223) for the pivotal movement the hub (218), said bearing (223) having a diameter (D) in the range of 0.7 H≤D≤2H, wherein H is the height of the unit, comprising the motor (213) and the gearing (214).

5. The adjustable device according to claim 4, wherein the height (H) of the unit comprising the motor (213) and the gearing (214) is about the same as or less than a width (W) of the single unit.

6. The adjustable device according to claim 5, wherein the interior of the unit comprising the motor (213) and the gearing (214) is sealed against water by a sealing (222).

7. The adjustable device according to claim 1, wherein at least one of said bearings (223) is a roller bearing.

8. The adjustable device according to claim 1, wherein the adjustable device (211) is freely rotatable over +360°.

9. The adjustable device, according to claim 1, wherein said casing (125) is arranged to be attached from the inside to the hull (2).

10. A boat having the adjustable stabilizing device according to claim 1, including at least two adjustable devices (4a, 4b, 104a, 104b) mounted on the hull (2, 102) of the boat, each adjustable device (4a, 4b, 104a, 104b) being rotatable around a respective rotational axis (6a, 6b), which stabilizing device is arranged to be set in an operation mode at which each adjustable device (4a, 4b, 104a, 104b) is arranged to be rotatable around its rotational axis (6a, 6b) or in a resting position at which each adjustable device (4a, 4b, 104a, 104b) is arranged to be stationary, wherein each adjustable device (4a, 4b, 104a, 104b) is mounted on a transom (3, 7, 103) of the hull (2, 102), in the operation mode reaches at least one of laterally and vertically outside the transom (3, 7, 103), and in the resting position is shielded by the transom (3, 7, 103), and whereby each adjustable device (4a, 4b, 104a, 104b) is arranged to change between operation mode and resting position by rotation around its rotational axis (6a, 6b).

11. The boat according to claim 10, wherein each rotational axis (6a, 6b) forms an angle of less than 30° with a line parallel to a longitudinal axis of the boat, the angle is in the range of 0 to 10°.

12. The boat according to claim 10, wherein said adjustable device is in the form of a paddle (4a, 4b, 104a, 104b) provided with shaft means and interconnecting arms (5a, 5b, 105a, 105b) for providing the rotation of the paddle (4a, 4b, 104a, 104b), which shaft means is aligned with the respective rotational axis (6a, 6b) and is drivingly connected to drive means.

13. The boat according to claim 10, wherein the boat further includes sensing means (131, 132, 133) sensing at least one parameter indicative of a rolling of the boat around a longitudinal axis of the boat, and wherein said parameter is an angular position of the boat around said longitudinal axis, a first time derivate of said angular position or a second time derivate of said angular position or wherein said parameter is obtained by processed data from a plurality of said sensed parameters, wherein said parameter governs the rotation of each paddle (4a, 4b, 104a, 104b).

14. The boat according to claim 10, wherein the boat includes a speed measuring device measuring a speed of the boat, and a control device arranged to position each paddle (4a, 4b, 104a, 104b) in said resting position when the speed is above a certain threshold and to set the paddle in said operation mode when the boat speed is at or below said threshold.

15. The boat according to claim 14, wherein the threshold is in a range of 10 to 15 knots (5.1-7.6 m/s).

* * * * *